United States Patent
Hsieh

(10) Patent No.: US 10,664,081 B2
(45) Date of Patent: May 26, 2020

(54) OPTICAL TOUCH SYSTEM

(71) Applicant: AU Optronics Corporation, Hsin-Chu (TW)

(72) Inventor: Tsung-Hsien Hsieh, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 37 days.

(21) Appl. No.: 15/991,105

(22) Filed: May 29, 2018

(65) Prior Publication Data
US 2019/0187847 A1 Jun. 20, 2019

(30) Foreign Application Priority Data

Dec. 19, 2017 (TW) .............................. 106144632 A

(51) Int. Cl.
| | | |
|---|---|---|
| *G06F 3/041* | (2006.01) | |
| *G06K 9/00* | (2006.01) | |
| *G06F 3/042* | (2006.01) | |

(52) U.S. Cl.
CPC ............ *G06F 3/0412* (2013.01); *G06F 3/042* (2013.01); *G06F 3/0418* (2013.01); *G06F 3/0421* (2013.01); *G06F 3/04166* (2019.05); *G06F 3/041661* (2019.05); *G06K 9/0004* (2013.01); *G06K 9/00026* (2013.01)

(58) Field of Classification Search
CPC .... G06F 3/041; G06F 3/0412; G06F 3/04166; G06F 3/041661; G06F 3/042; G06F 3/0421; G06K 9/00006–0012; G09G 2360/14–148
See application file for complete search history.

(56) References Cited

U.S. PATENT DOCUMENTS

| | | | | |
|---|---|---|---|---|
| 8,373,825 B2* | 2/2013 | Usukura | ............... | G06F 3/0412 349/61 |
| 8,525,953 B2* | 9/2013 | Katoh | ................... | G06F 3/0412 349/72 |
| 8,816,285 B2* | 8/2014 | Katoh | ..................... | G06F 3/042 250/349 |
| 9,041,692 B2* | 5/2015 | Nemoto | ................ | G06F 3/0412 345/175 |
| 9,064,460 B2* | 6/2015 | Sugita | ................... | G09G 3/3406 |
| 9,069,412 B2* | 6/2015 | Tanaka | ................... | G06F 3/0412 |
| 9,316,856 B2* | 4/2016 | Park | ......................... | G06F 3/041 |
| 9,335,854 B2* | 5/2016 | Sugita | ................... | G06F 3/0412 |

(Continued)

FOREIGN PATENT DOCUMENTS

| | | |
|---|---|---|
| TW | I469019 B | 11/2010 |
| TW | 201239717 A | 10/2012 |

*Primary Examiner* — Gene W Lee
(74) *Attorney, Agent, or Firm* — WPAT, PC

(57) ABSTRACT

An optical touch system includes a touch panel and a reading circuit. The touch panel comprises a first touch area including a plurality of image sensing units, where the plurality of image sensing units is arranged to form an array of a plurality of columns and a plurality of rows. The reading circuit is coupled to the plurality of image sensing units, where the plurality of image sensing units includes a first selected image sensing unit and a second selected image sensing unit. The reading circuit reads the first selected image sensing unit in the first touch area in a first touch sensing frame, and the reading circuit reads the second selected image sensing unit in the first touch area in a second touch sensing frame.

5 Claims, 10 Drawing Sheets

(56) References Cited

U.S. PATENT DOCUMENTS

| | | | |
|---|---|---|---|
| 2005/0219229 A1* | 10/2005 | Yamaguchi | G06F 3/0412 345/173 |
| 2012/0176356 A1* | 7/2012 | Usukura | G06F 3/0416 345/207 |
| 2012/0235967 A1* | 9/2012 | Katoh | G06F 3/0412 345/207 |
| 2012/0262424 A1* | 10/2012 | Tanaka | G06F 3/0412 345/175 |
| 2012/0268439 A1* | 10/2012 | Yamamoto | G06F 3/0412 345/207 |
| 2012/0313913 A1* | 12/2012 | Shiraki | G06F 3/0412 345/207 |
| 2013/0009888 A1* | 1/2013 | Park | G02F 1/13338 345/173 |
| 2013/0063407 A1* | 3/2013 | Usukura | G06F 3/0412 345/207 |
| 2013/0113768 A1* | 5/2013 | Yamamoto | G06F 3/0412 345/207 |
| 2013/0120331 A1* | 5/2013 | Yamamoto | G06F 3/0412 345/207 |
| 2014/0300582 A1 | 10/2014 | Cheng et al. | |
| 2016/0266695 A1* | 9/2016 | Bae | G06F 1/1643 |
| 2017/0017340 A1 | 1/2017 | Liu et al. | |
| 2018/0082100 A1 | 3/2018 | Hsieh et al. | |
| 2018/0101713 A1 | 4/2018 | Chang | |
| 2018/0204035 A1* | 7/2018 | Kim | G06F 3/0416 |

\* cited by examiner

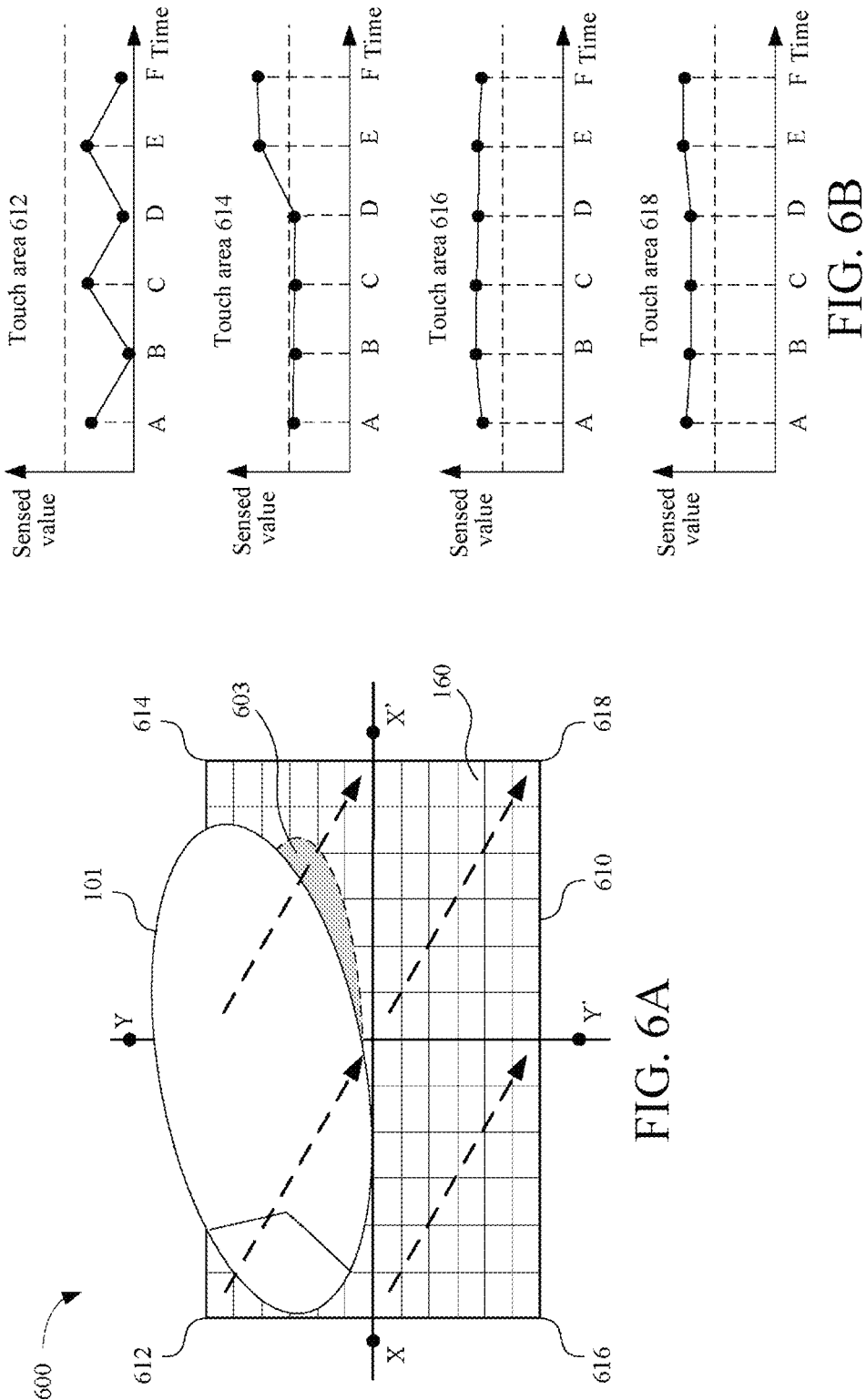

OPTICAL TOUCH SYSTEM

BACKGROUND

Technical Field

The present disclosure relates to a touch system, and in particular, to an optical touch system.

Related Art

In current electronic consumer products, touch panels have become an indispensable and vital component. Conventional optical touch panels feature high dots per inch (DPI) and high transmittance. However, the conventional optical touch panels, being incapable of accurately identifying a position of a touch point, are greatly limited in application. In view of this, how to provide an optical touch system capable of accurately identifying a position of a touch point is to be resolved in the industry.

SUMMARY

In the embodiment of the invention of the optical touch system comprises a touch panel and a reading circuit. The touch panel comprises a first touch area including a plurality of image sensing units, wherein the plurality of image sensing units is arranged to form an array of a plurality of columns and a plurality of rows. The reading circuit is coupled to each of the plurality of image sensing units, wherein the plurality of image sensing units comprises a first selected image sensing unit and a second selected image sensing unit. The reading circuit reads first selected image sensing unit in the first touch area in a first touch sensing frame, and the reading circuit reads the second selected image sensing unit in the first touch area in a second touch sensing frame.

In the embodiment of the invention of the optical touch system comprises a touch panel and a selection circuit. The touch panel comprises a plurality of image sensing units, wherein the plurality of image sensing units is arranged to form an array of a plurality of columns and a plurality of rows. The selection circuit is used for driving the plurality of image sensing units according to a driving clock signal and a driving enable signal. The driving clock signal comprises a driving period and a non-driving period, the driving period has a first time length, the non-driving period has a second time length, and the first time length is longer than the second time length.

In the embodiment of the invention of the optical touch system comprises a display module, a touch panel, and a reading circuit. The display module comprises a plurality of source signal lines, a plurality of gate signal lines, and a pixel area, wherein the source signal lines and the gate signal lines are separately coupled to the pixel area. The touch panel overlaps the display module and comprises a plurality of touch areas, wherein the plurality of touch areas comprises a first touch area, the first touch area comprises a plurality of image sensing units, and the plurality of image sensing units is arranged to form an array of a plurality of columns and a plurality of rows. The reading circuit is coupled to each of the plurality of image sensing units, wherein the plurality of image sensing units comprises a first selected image sensing unit and a second selected image sensing unit. The reading circuit reads the first selected image sensing unit in the first touch area in a first touch sensing frame, and the reading circuit reads the second selected image sensing unit in the first touch area in a second touch sensing frame.

BRIEF DESCRIPTION OF THE DRAWINGS

To make the foregoing and other objectives, features, advantages, and embodiments of the present disclosure clearer and more comprehensible, the following describes the accompanying drawings:

FIG. 6A is a simplified schematic diagram of an operation embodiment of an optical touch system according to another embodiment of the present disclosure;

FIG. 6B is a time sequence change diagram of an image sensed value obtained after an image sensing unit in FIG. 6A is read by a reading circuit in different touch sensing frames.

DETAILED DESCRIPTION

Figure 1A:
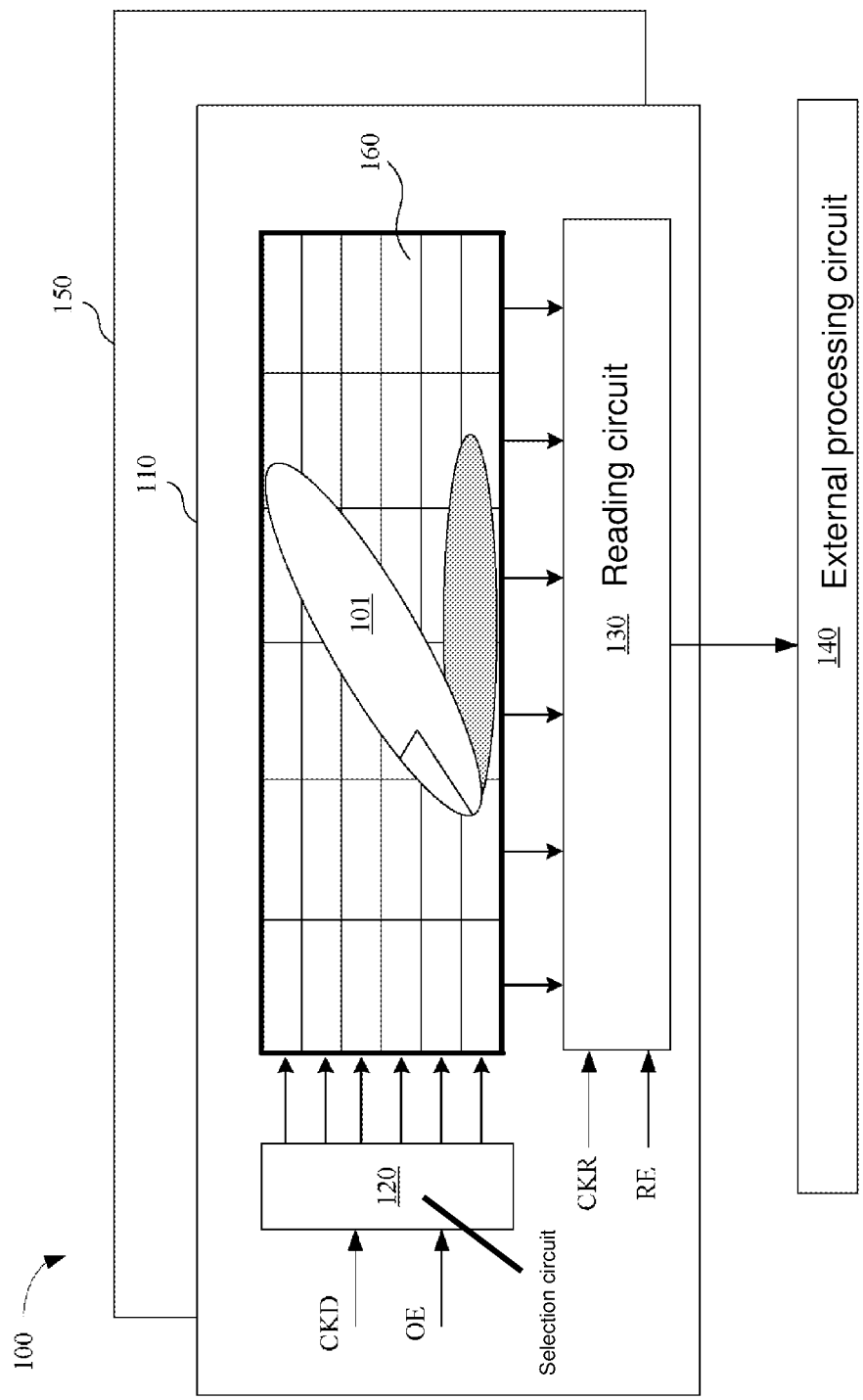
FIG. 1A is a simplified functional block diagram of an optical touch system according to an embodiment of the present disclosure.

The following describes embodiments of the present invention with reference to the related drawings. In the drawings, a same reference sign represents same or similar elements or method procedures.

FIG. 1A is a simplified functional block diagram of an optical touch system 100 according to an embodiment of the present disclosure. As shown in FIG. 1A, the optical touch system 100 includes: a touch panel 110, a selection circuit 120, a reading circuit 130, an external processing circuit 140, and a backlight module 150. The touch panel 110 includes a plurality of image sensing units 160. The plurality of image sensing units 160 is arranged to form an array including a plurality of columns and a plurality of rows, and the selection circuit 120 and the reading circuit 130 are coupled to each image sensing unit 160. The selection circuit 120 and the reading circuit 130 are disposed on one surface of the touch panel 110, the backlight module 150 is disposed on another surface of the touch panel 110, and the reading circuit 130 is coupled to the external processing circuit 140. For simplicity of the drawing and ease of description, other elements and connection relationships in the optical touch system 100 are not drawn in FIG. 1A.

In an embodiment, the external processing circuit 140 is disposed on an additional circuit board, and the touch panel 110 is a glass substrate. However, the present invention is not limited thereto. For example, the external processing circuit 140 is alternatively disposed on the touch panel 110, and the touch panel 110 is alternatively a flexible substrate.

The backlight module 150 is used for outputting a particular light ray having a wavelength within a particular wave band (a particular light ray for short below), and the particular light ray can penetrate the touch panel 110. The image sensing unit 160 is used for detecting a particular light ray reflected onto the touch panel 110 and generating a corresponding image sensed value according to intensity of the detected particular light ray.

In practice, the foregoing particular light ray is a light ray within an infrared light wave band.

Specifically, the image sensed value represents a quantity of electric charges stored in a storage capacitor (not shown) of the image sensing unit 160. When the particular light ray is detected by the image sensing unit 160, the image sensing unit 160 discharges the storage capacitor. In addition, greater intensity of the particular light ray detected by the image sensing unit 160 indicates a higher speed at which the image sensing unit 160 discharges the storage capacitor. In this way, the intensity of the detected particular light ray is recorded by the image sensing unit 160 by using the quantity of electric charges stored in the storage capacitor.

The selection circuit 120 is used for sequentially driving the image sensing units 160 according to a driving clock signal CKD and a driving enable signal OE. The reading circuit 130 is used for reading the image sensing unit 160 according to a reading clock signal CKR and a reading enable signal RE. When the selection circuit 120 drives an image sensing unit 160 in a row, the reading circuit 130 reads the image sensing unit 160 in the row.

Figure 1B:
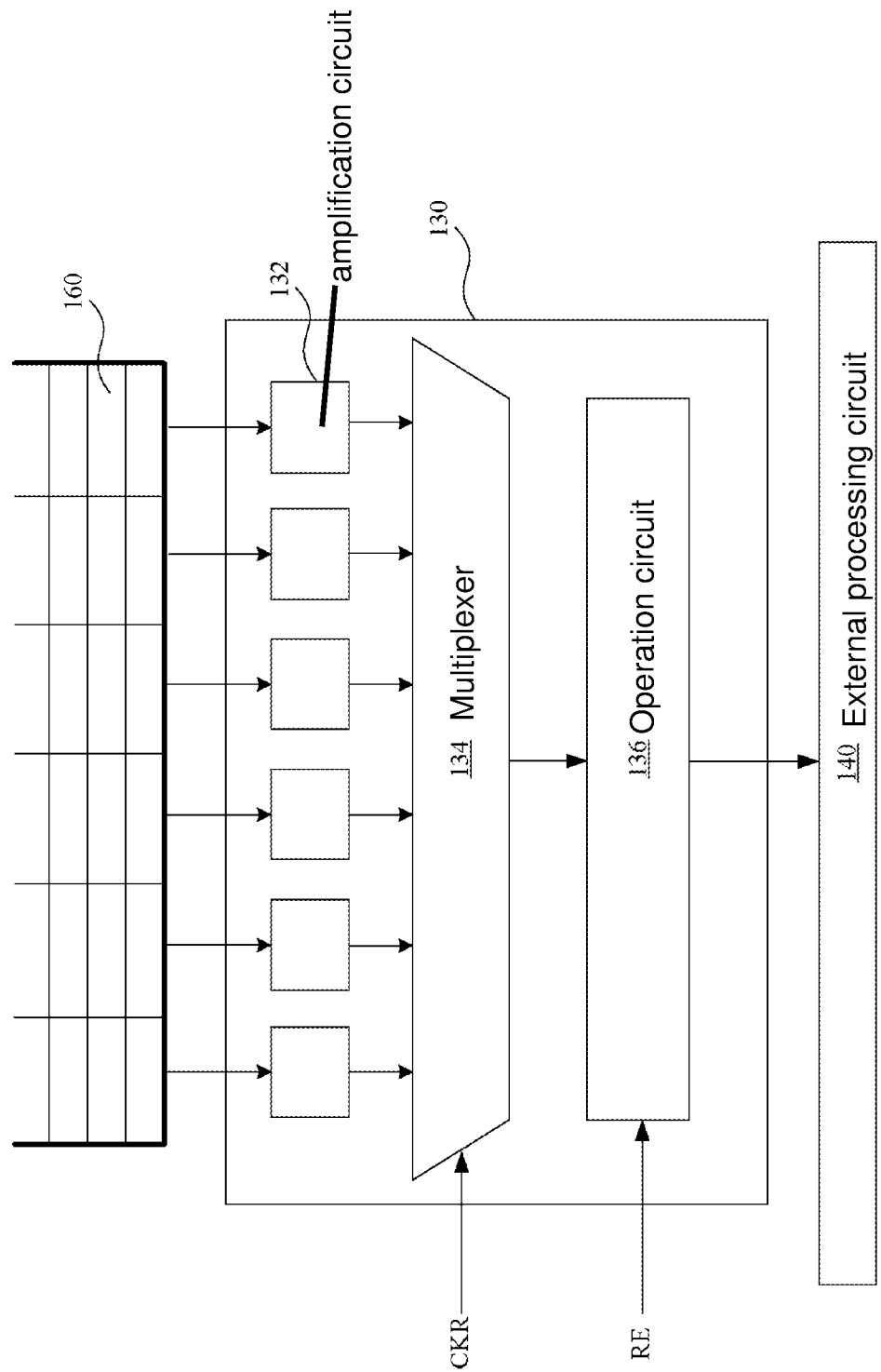
FIG. 1B is a partially enlarged functional block diagram of the optical touch system in FIG. 1A.

FIG. 1B is a partially enlarged functional block diagram of the optical touch system in FIG. 1A. The following further describes operation of the reading circuit 130 with reference to FIG. 1A and FIG. 1B. Referring to FIG. 1B, the reading circuit 130 includes: a plurality of amplification circuits 132, a multiplexer 134, and an operation circuit 136. Each of the plurality of amplification circuits 132 is coupled to a column of image sensing units 160 on the touch panel 110. Each of a plurality of input ends of the multiplexer 134 is coupled to an amplification circuit 132. An output end of the multiplexer 134 is coupled to the operation circuit 136.

When the selection circuit 120 drives an image sensing unit 160 in a row, each image sensing unit 160 in the row couples a storage capacitor to a corresponding amplification circuit 132. The amplification circuit 132 reads, in an electric charge sharing manner, an image sensed value in the storage capacitor of the image sensing unit 160, and then outputs the read image sensed value to the multiplexer 134. The multiplexer 134 selects, according to the reading clock signal CKR, an image sensed value output by one of the plurality of amplification circuits 132 and outputs it to the operation circuit 136. That is, the multiplexer 134 selects, according to the reading clock signal CKR, an image sensed value of an image sensing unit 160 in a column and outputs it to the operation circuit 136.

The operation circuit 136 determines, according to the reading enable signal RE, whether to process the received image sensed value and whether to output the processed image sensed value to the external processing circuit 140. The processing performed by the operation circuit 136 on the image sensed value may include analog-to-digital conversion processing, signal amplification processing, and the like. When receiving the image sensed value processed by the operation circuit 136, the external processing circuit 140 calculates, according to the received image sensed value, an image corresponding to a touching object 101, to determine a position at which the touching object 101 touches the touch panel 110.

Figure 2A:
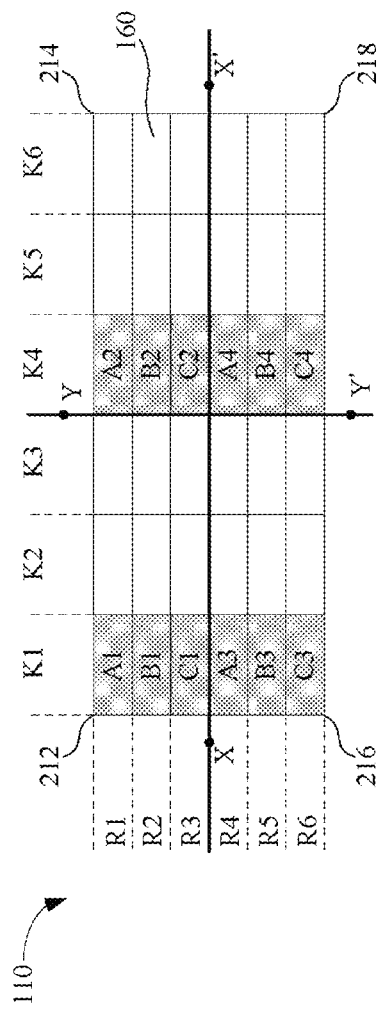
FIG. 2A is a simplified schematic diagram of an operation embodiment of the optical touch system in FIG. 1A.

The following further describes various operation embodiments of the optical touch system 100 with reference to FIG. 2A to FIG. 5C. FIG. 2A is a simplified schematic diagram of an operation embodiment of the optical touch system 100 in FIG. 1A. As shown in FIG. 2A, the image sensing units 160 on the touch panel 110 are arranged to form an array including columns K1 to K6 and rows R1 to R6. The touch panel 110 can be divided into a first touch area 212, a second touch area 214, a third touch area 216, and a fourth touch area 218 along a direction of a straight line X-X' and a direction of a straight line Y-Y'. Each of the first to the fourth touch areas 212, 214, 216, and 218 includes a plurality of image sensing units 160. In this embodiment, the plurality of image sensing units 160 is arranged to form a rectangular array. However, the present invention is not limited thereto. For example, the plurality of image sensing units 160 are alternatively arranged to form an array in which two adjacent rows or columns are staggered.

In this embodiment, the plurality of image sensing units 160 in each touch area includes three selected image sensing units. The selected image sensing units represent image sensing units 160 predetermined to be read by the reading circuit 130. Specifically, the plurality of image sensing units 160 in the first touch area 212 includes selected image sensing units A1, B1, and C1. The plurality of image sensing units 160 in the second touch area 214 includes selected image sensing units A2, B2, and C2. The plurality of image sensing units 160 in the third touch area 216 includes selected image sensing units A3, B3, and C3. The plurality of image sensing units 160 in the fourth touch area 218 includes selected image sensing units A4, B4, and C4. The selected image sensing units A1, B1, C1, A3, B3, and C3 are located in the column K1, and the selected image sensing units A2, B2, C2, A4, B4, and C4 are located in the column K4. That is, selected image sensing units in a same touch area are located in a same vertical column.

It should be noted that a quantity of the image sensing units 160 and a quantity of the selected image sensing units in the present disclosure are only exemplary embodiments, and are not intended to limit the image sensing units 160 and the selected image sensing units to a particular quantity. In addition, a quantity of the touch areas on the touch panel 110 and the quantity of the image sensing units 160 included in each touch area are not limited to the present disclosure.

Figure 2B:
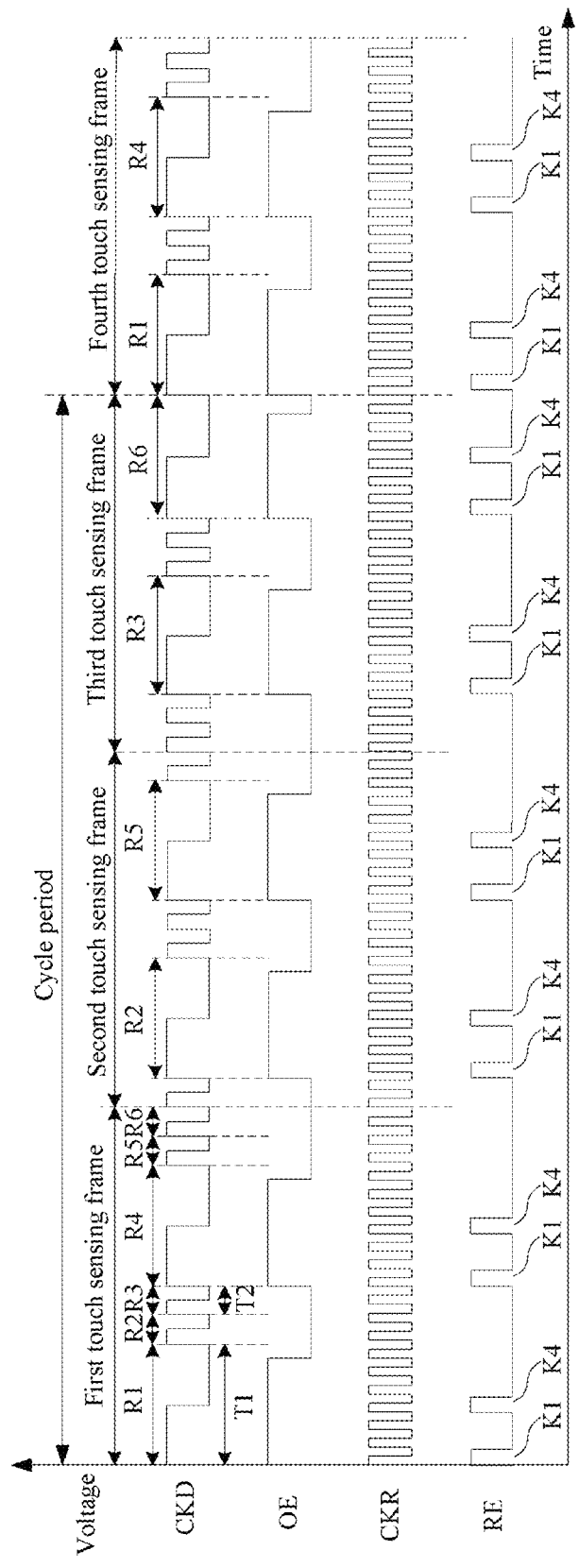
FIG. 2B is a simplified time sequence diagram of the operation embodiment in FIG. 2A.

FIG. 2B is a simplified time sequence diagram of the operation embodiment in FIG. 2A. As shown in FIG. 2B, the driving clock signal CKD includes a plurality of driving periods and a plurality of non-driving periods. Each driving period has a first time length T1, each non-driving period has a second time length T2, and the first time length T1 is longer than the second time length T2. The driving enable signal OE includes a plurality of driving enable periods and a plurality of rest periods. The driving enable signal OE is at a high voltage level in the driving enable period, and the driving enable signal OE is at a low voltage level in the rest period.

During the driving enable period when the driving enable signal OE is at a high voltage level, the driving clock signal CKD is in the driving period having the first time length T1. During the rest period when the driving enable signal OE is at a low voltage level, the driving clock signal CKD is in the non-driving period having the second time length T2. The selection circuit 120 drives the image sensing unit 160 only when a time sequence of the driving period of the driving clock signal CKD overlaps a time sequence of the driving enable period of the driving enable signal OE. In the embodiment in FIG. 2B, according to the driving clock signal CKD and the driving enable signal OE, the selection circuit 120 drives the row R1 and the row R4 in a first touch sensing frame, drives the row R2 and the row R5 in a second touch sensing frame, and drives the row R3 and the row R6 in a third touch sensing frame, then, operation the same as the operation in the first touch sensing frame is performed in a fourth touch sensing frame, and this process is a cycle period. Details are not described herein again.

In this embodiment, the driving clock signal CKD, the driving enable signal OE, the reading enable signal RE, and the reading clock signal CKR cooperate with each other to enable the reading circuit 130 to read a particular image sensing unit 160. Referring to FIG. 2A and FIG. 2B together, in the first touch sensing frame in this embodiment, when the time sequence of the driving period of the driving clock signal CKD overlaps the time sequence of the driving enable period of the driving enable signal OE for a first time, the selection circuit 120 drives the row R1. The reading enable signal RE is at a high potential when the multiplexer 134 in the selection circuit 130 selects the columns K1 and K4, and is at a low potential when the multiplexer 134 selects another column. Therefore, the operation circuit 136 in the reading circuit 130 processes image sensed values of the selected image sensing units A1 and A2, respectively located in the column K1 and the column K4, in the row R1 (that is, the reading circuit 130 reads the selected image sensing units A1 and A2).

In another word, during this period, the selected image sensing unit A1 corresponding to the row R1 and the column K1 and the elected sensing unit A2 corresponding to the row R1 and the column K4 perform sensing and are read. Therefore, the selected image sensing unit A1 in the first touch area 212 and the selected image sensing unit A2 in the second touch area 214 are sequentially driven to perform sensing, and sensed values of the two selected image sensing units are sequentially read.

Still in the first touch sensing frame, when the time sequence of the driving period of the driving clock signal CKD overlaps the time sequence of the driving enable period of the driving enable signal OE for a second time, the selection circuit 120 drives the row R4, and the reading enable signal RE is at a high potential when the multiplexer 134 selects the columns K1 and K4, and is at a low potential when the multiplexer 134 selects another column. Therefore, the reading circuit 130 reads the selected image sensing units A3 and A4, respectively located in the column K1 and the column K4, in the row R4.

In another word, during this period, the selected image sensing unit A3 corresponding to the row R4 and the column K1 and the elected sensing unit A4 corresponding to the row R4 and the column K4 perform sensing and are read. Therefore, the selected image sensing unit A3 in the third touch area 216 and the selected image sensing unit A4 in the fourth touch area 218 are sequentially driven to perform sensing, and sensed values of the two selected image sensing units are sequentially read. Therefore, in the first touch sensing frame in this embodiment, a single selected image sensing unit in each touch area performs sensing and is read. For example, in the first touch sensing frame, a sensing and reading sequence is the selected image sensing unit A1 in the first touch area 212, the selected image sensing unit A2 in the second touch area 214, the selected image sensing unit A3 in the third touch area 216, and the selected image sensing unit A4 in the fourth touch area 218.

In the second touch sensing frame in this embodiment, the selection circuit 120 drives the image sensing units 160 in the row R2 and the row R5 instead. When the selection circuit 120 drives the row R2, the reading circuit 130 reads the selected image sensing units B1 and B2, respectively located in the column K1 and the column K4, in the row R2. When the selection circuit 120 drives the row R5, the reading circuit 130 reads the selected image sensing units B3 and B4, respectively located in the column K1 and the column K4, in the row R5. Specifically, in the second touch sensing frame, a single selected image sensing unit in each touch area performs sensing and is read. Referring to FIG. 2A and FIG. 2B, in the second touch sensing frame, a sensing and reading sequence is the selected image sensing unit B1 in the first touch area 212, the selected image sensing unit B2 in the second touch area 214, the selected image sensing unit B3 in the third touch area 216, and the selected image sensing unit B4 in the fourth touch area 218.

In the third touch sensing frame in this embodiment, the selection circuit 120 drives the image sensing units 160 in the rows R3 and R6 instead. When the selection circuit 120 drives the row R3, the reading circuit 130 reads the selected image sensing units C1 and C2, respectively located in the column K1 and the column K4, in the row R3. When the selection circuit 120 drives the row R6, the reading circuit 130 reads the selected image sensing units C3 and C4, respectively located in the column K1 and the column K4, in the row R6. Specifically, in the third touch sensing frame, a single selected image sensing unit in each touch area performs sensing and is read. Referring to FIG. 2A and FIG. 2B, in the third touch sensing frame, a sensing and reading sequence is the selected image sensing unit C1 in the first touch area 212, the selected image sensing unit C2 in the second touch area 214, the selected image sensing unit C3 in the third touch area 216, and the selected image sensing unit C4 in the fourth touch area 218.

In the fourth touch sensing frame in this embodiment, cooperative operation between the selection circuit 120 and the reading circuit 130 is similar to the cooperative operation therebetween in the first touch sensing frame. For brevity, details are not described herein again.

In another word, as shown in FIG. 2B, the cooperative operation between the selection circuit 120 and the reading circuit 130 uses three touch sensing frames as a cycle period. For example, the first to the third touch sensing frames belong to a same cycle period, and the fourth touch sensing frame is the first touch sensing frame of another cycle period. Therefore, either of the driving clock signal CKD and the driving enable signal OE has a varying waveform in adjacent touch sensing frames.

In this embodiment, the reading circuit 130 transmits a read image sensed value to the external processing circuit 140 in each touch sensing frame. The external processing circuit 140 calculates an image that corresponds to the touching object 101 according to the received image sensed value in each touch sensing frame.

It can be learned from the above that, in the embodiment in FIG. 2A and FIG. 2B, a plurality of touch areas, such as the first touch area 212, the second touch area 214, the third touch area 216, and the fourth touch area 218, are formed on the touch panel 110. In each touch area, one or more selected image sensing units (for example, three selected image sensing units) are selected from the plurality of image sensing units 160, and the selected image sensing units are sequentially driven to perform touch-sensing, and sensed values thereof are read. In this embodiment, the selected image sensing units in each touch area are vertically arranged (as shown in FIG. 2A). This is considered as an aspect of performing vertical reading. In addition, in two touch sensing frames having adjacent time sequences, the reading circuit 130 does not read a same selected image sensing unit. Therefore, the optical touch system 100 can ensure that there is adequate time for each selected image sensing unit to discharge the storage capacitor according to the intensity of the detected particular light ray, thereby increasing accuracy of image sensing.

As described above, the reading circuit 130 reads the image sensed value of the image sensing unit 160 by using the amplification circuit 132 in an electric charge sharing manner. To enable the amplification circuit 132 to have more adequate time to perform electric charge sharing, when the selection circuit 120 drives an image sensing unit 160 in a row, the reading circuit 130 reads the image sensing unit 160 in the row after waiting for a preset time period instead of reading the image sensing unit 160 in the row immediately. In this way, the accuracy of the image sensed value read by the reading circuit 130 is further improved.

Figure 2C:
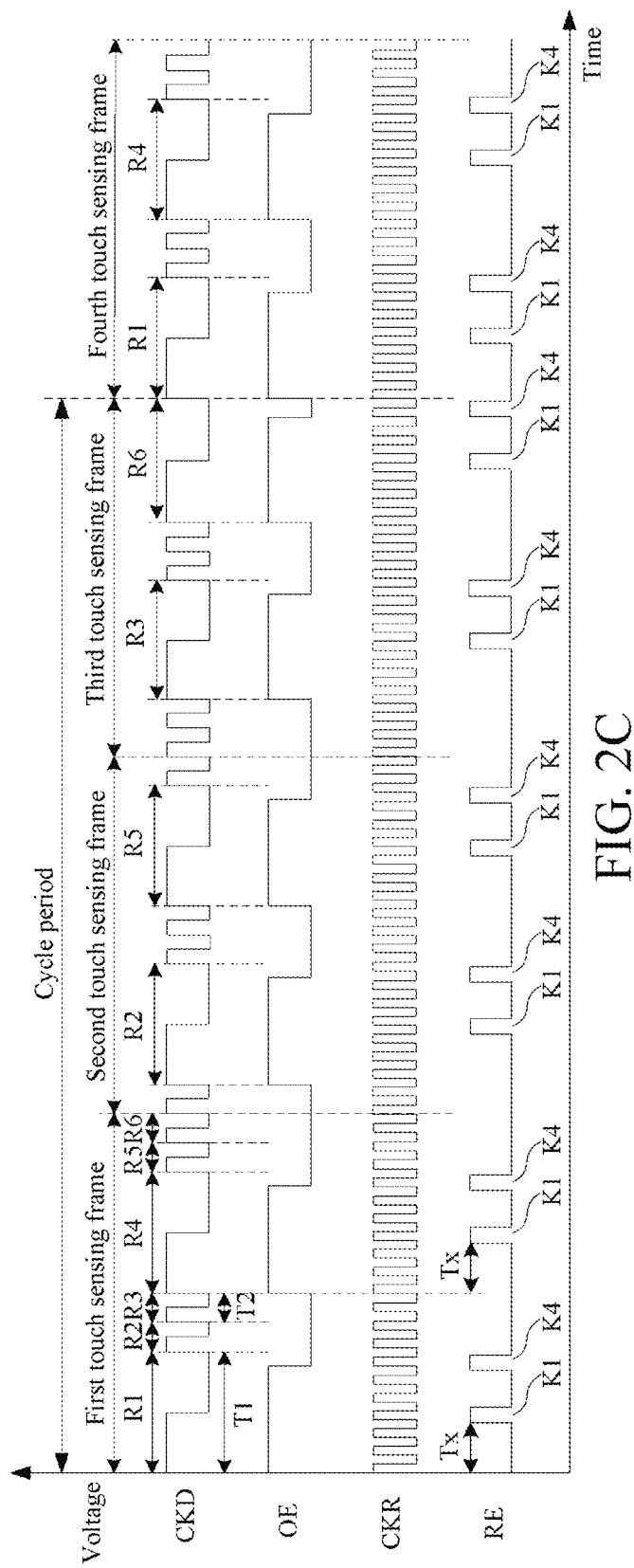
FIG. 2C is another simplified time sequence diagram of the operation embodiment in FIG. 2A.

For example, in some embodiments, an operating manner of the optical touch system 100 is shown in FIG. 2A and FIG. 2C. In the first touch sensing frame, when the selection circuit 120 drives the row R1, the reading enable signal RE is at a low potential in a preset time period Tx first, so that there is adequate time for the plurality of amplification circuits 132 that respectively corresponds to the rows K1 to K6 to perform electric charge sharing. Then, the reading enable signal RE switches to a high potential when the multiplexer 134 selects the rows K1 and K4, so that the reading circuit 130 reads the selected image sensing units A1 and A2. In the following touch sensing frame, when the selection circuit 120 drives a row, likewise, the reading enable signal RE is at a low potential in a preset time period Tx first, and then switches to a high potential, so that the reading circuit 130 reads a selected image sensing unit in the row. For brevity, details are not described herein again.

In addition, a length of the preset time period Tx is adjusted according to the varying image accuracy needed. Therefore, when the driving enable signal OE is in either the driving enable period or the rest period, the reading circuit 130 can read a selected image sensing unit. That is, when the driving enable signal OE is in the driving enable period or the rest period, the reading enable signal RE can switch a voltage level one or more times.

Figure 3A:
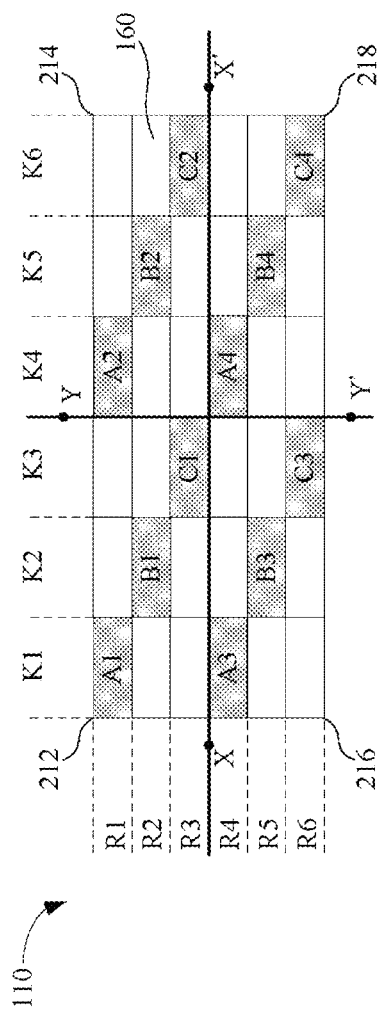
FIG. 3A is a simplified schematic diagram of another operation embodiment of the optical touch system in FIG. 1A.

FIG. 3A is a simplified schematic diagram of another operation embodiment of the optical touch system 100 in FIG. 1A. The embodiment in FIG. 3A is similar to the embodiment in FIG. 2A and differs from the embodiment in FIG. 2A in that a position of a selected image sensing unit in FIG. 3A is different from a position of a selected image sensing unit in FIG. 2A. Specifically, in the embodiment in FIG. 3A, the selected image sensing units A1, B1, and C1 are located on a diagonal of the first touch area 212. The selected image sensing units A2, B2, and C2 are located on a diagonal of the second touch area 214. The selected image sensing units A3, B3, and C3 are located on a diagonal of the third touch area 216. The selected image sensing units A4, B4, and C4 are located on a diagonal of the fourth touch area 218. That is, the selected image sensing units in each touch area are located on a diagonal of the touch area.

Figure 3B:
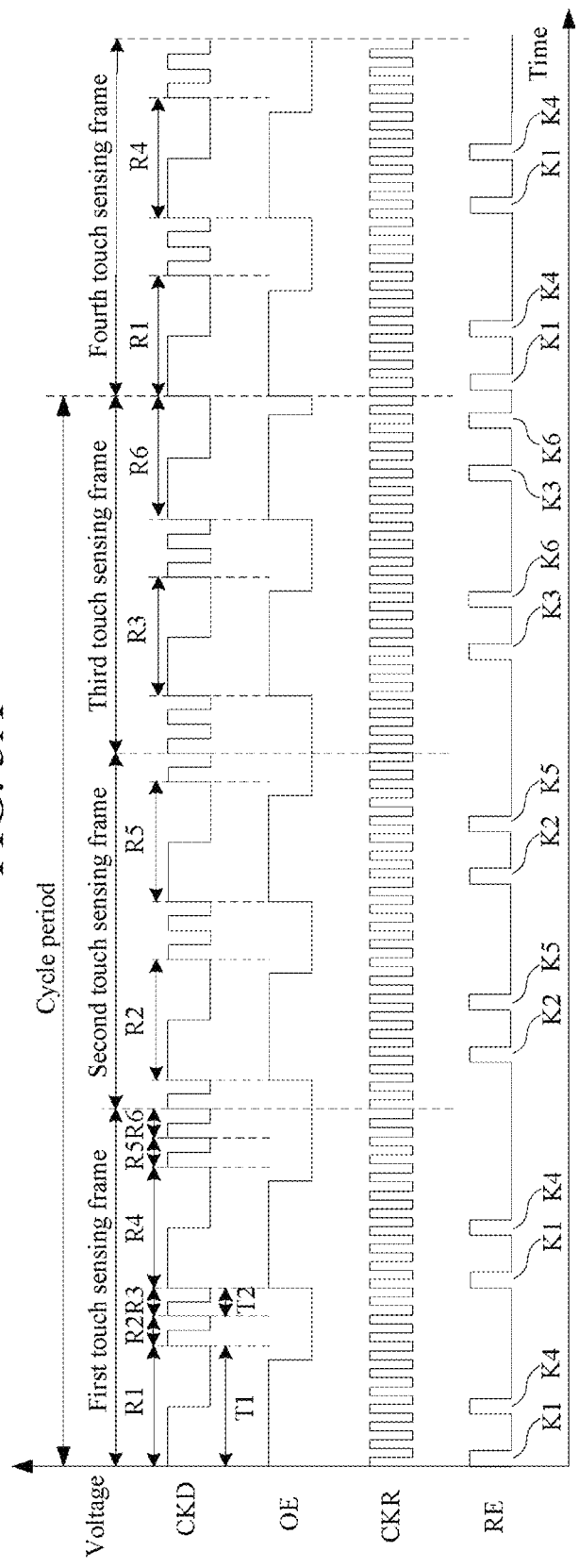
FIG. 3B is a simplified time sequence diagram of the operation embodiment in FIG. 3A.

FIG. 3B is a simplified time sequence diagram of the operation embodiment in FIG. 3A. Referring to FIG. 3A and FIG. 3B together, in a first touch sensing frame in this embodiment, when the selection circuit 120 drives the image sensing unit 160 in the row R1 or the row R4, the reading enable signal RE is at a high potential when the multiplexer 134 selects the columns K1 and K4, and is at a low potential when the multiplexer 134 selects another column. Therefore, in the first touch sensing frame, the reading circuit 130 reads the selected image sensing units A1 and A2, respectively located in the column K1 and the column K4, in the row R1, and reads the selected image sensing units A3 and A4, respectively located in the column K1 and the column K4, in the row R4.

In a second touch sensing frame in this embodiment, when the selection circuit 120 drives the image sensing unit 160 in the row R2 or the row R5, the reading enable signal RE is at a high potential when the multiplexer 134 selects the columns K2 and K5, and is at a low potential when the multiplexer 134 selects another column. Therefore, in the second touch sensing frame, the reading circuit 130 reads the selected image sensing units B1 and B2, respectively located in the column K2 and the column K5, in the row R2, and reads the selected image sensing units B3 and B4, respectively located in the column K2 and the column K5, in the row R5.

In a third touch sensing frame in this embodiment, when the selection circuit 120 drives the image sensing unit 160 in the row R3 or the row R6, the reading enable signal RE is at a high potential when the multiplexer 134 selects the columns K3 and K6, and is at a low potential when the multiplexer 134 selects another column. Therefore, in the third touch sensing frame, the reading circuit 130 reads the selected image sensing units C1 and C2, respectively located in the column K3 and the column K6, in the row R3, and reads the selected image sensing units C3 and C4, respectively located in the column K3 and the column K6, in the row R6.

In a fourth touch sensing frame in this embodiment, cooperative operation between the selection circuit 120 and the reading circuit 130 is similar to the cooperative operation therebetween in the first touch sensing frame. For brevity, details are not described herein again. In the embodiment in FIG. 3A and FIG. 3B, the selected image sensing units in each touch sensing area are arranged on a diagonal. This is considered as an aspect of performing oblique reading.

In another word, in this embodiment, the cooperative operation between the selection circuit 120 and the reading circuit 130 uses three touch sensing frames as a cycle period. Therefore, either of the driving clock signal CKD and the driving enable signal OE has a varying waveform in adjacent touch sensing frames.

The operating manners and advantages of the many functional blocks in the embodiment in FIG. 2A and FIG. 2B are also applicable to the embodiment in FIG. 3A and FIG. 3B. In addition, the embodiment in FIG. 3A and FIG. 3B alternatively use an operating manner similar to that in the embodiment in FIG. 2C. That is, the reading enable signal RE in FIG. 3B is delayed for a preset time period Tx. For brevity, details are not described herein again.

Figure 4A:
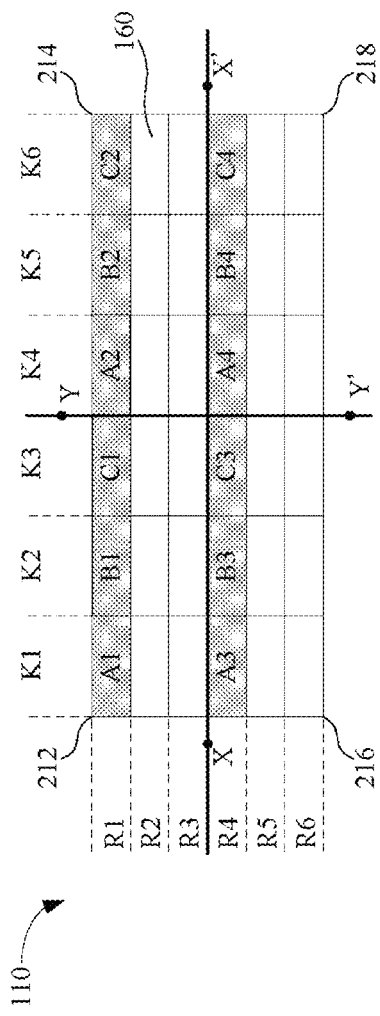
FIG. 4A is a simplified schematic diagram of still another operation embodiment of the optical touch system in FIG. 1A.

FIG. 4A is a simplified schematic diagram of still another operation embodiment of the optical touch system 100 in FIG. 1A. The embodiment in FIG. 4A is similar to the embodiment in FIG. 2A, and differs from the embodiment in FIG. 2A in that a position of a selected image sensing unit in FIG. 4A is different from a position of a selected image sensing unit in FIG. 2A. Specifically, the selected image sensing units A1, B1, and C1 in the first touch area 212 and the selected image sensing units A2, B2, and C2 in the second touch area 214 are located in the row R1, and the selected image sensing units A3, B3, and C3 in the third touch area 216 and the selected image sensing units A4, B4, and C4 in the fourth touch area 218 are located in the row R4. That is, the selected image sensing units in each touch area are located in a same horizontal row.

Figure 4B:
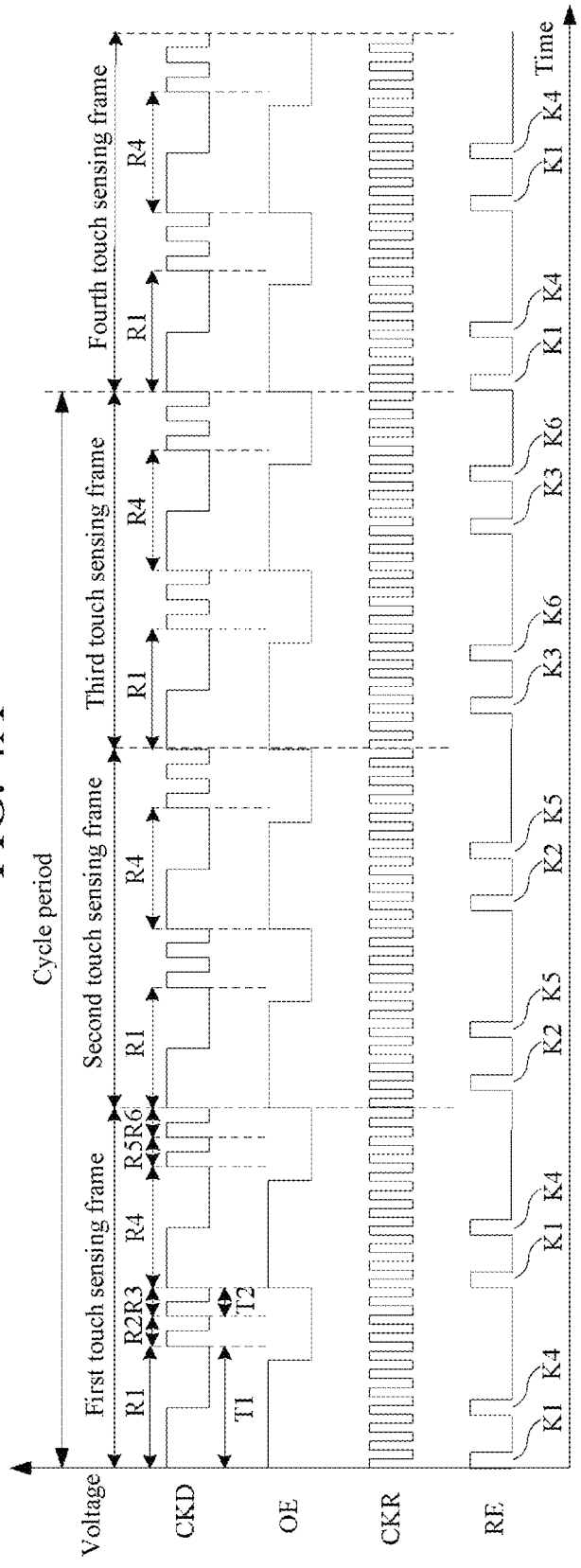
FIG. 4B is a simplified time sequence diagram of the operation embodiment in FIG. 4A.

FIG. 4B is a simplified time sequence diagram of the operation embodiment in FIG. 4A. Referring to FIG. 4A and FIG. 4B together, the selection circuit 120 in this embodiment only drives the image sensing units 160 in the rows R1 and R4 in each touch sensing frame.

In a first touch sensing frame in this embodiment, when the selection circuit 120 drives the image sensing unit 160 in the row R1, the reading circuit 130 reads the selected image sensing units A1 and A2, respectively located in the columns K1 and K4, in the row R1. When the selection circuit 120 drives the image sensing unit 160 in the row R4, the reading circuit 130 reads the selected image sensing units A3 and A4, respectively located in the columns K1 and K4, in the row R4.

In a second touch sensing frame in this embodiment, when the selection circuit 120 drives the image sensing unit 160 in the row R1, the reading circuit 130 reads the selected image sensing units B1 and B2, respectively located in the columns K2 and K5, in the row R1. When the selection circuit 120 drives the image sensing unit 160 in the row R4, the reading circuit 130 reads the selected image sensing units B3 and B4 respectively located in the columns K2 and K5 in the row R4.

In a third touch sensing frame in this embodiment, when the selection circuit 120 drives the image sensing unit 160 in the row R1, the reading circuit 130 reads the selected image sensing units C1 and C2, respectively located in the columns K3 and K6, in the row R1. When the selection circuit 120 drives the image sensing unit 160 in the row R4, the reading circuit 130 reads the selected image sensing units C3 and C4, respectively located in the columns K3 and K6, in the row R4.

In a fourth touch sensing frame in this embodiment, cooperative operation between the selection circuit 120 and the reading circuit 130 is similar to the cooperative operation therebetween in the first touch sensing frame. For brevity, details are not described herein again. In the embodiment in FIG. 4A and FIG. 4B, the sensing units in each touch sensing area are horizontally arranged. This is considered as an aspect of performing horizontal reading.

In this embodiment, the cooperative operation between the selection circuit 120 and the reading circuit 130 uses three touch sensing frames as a cycle period. It should be noted that the operation of the selection circuit 120 uses one touch sensing frame as a period. Therefore, either of the driving clock signal CKD and the driving enable signal OE has a same waveform in adjacent touch sensing frames.

The operating manners and advantages of the many functional blocks in the embodiment in FIG. 2A and FIG. 2B are also applicable to the embodiment in FIG. 4A and FIG. 4B. In addition, the embodiment in FIG. 4A and FIG. 4B alternatively use an operating manner similar to that in the embodiment in FIG. 2C. That is, the reading enable signal RE in FIG. 4B is delayed for a preset time period Tx. For brevity, details are not described herein again.

In the foregoing plurality of embodiments, the selection circuit 120 only drives one row of image sensing units 160 in each touch area in each touch sensing frame. In practice, the selection circuit 120 alternatively drives a plurality of adjacent rows of image sensing units 160 in each touch area in each touch sensing frame, to improve correctness of a reading result of the reading circuit 130.

For example, in an embodiment, when the reading circuit 130 attempts to read the selected image sensing units in the row R2 in a touch sensing frame, the selection circuit 120 drives the image sensing unit 160 in the row R1 first. In this way, a particular image sensing unit in the row R1 in a same column as that of the selected image sensing units in the row R2 shares electric charges in a storage capacitor to an amplification circuit 132 that corresponds to the selected image sensing units in the row R2. Subsequently, the selection circuit 120 drives the row R2, so that the selected image sensing units in the row R2 share electric charges in a storage capacitor to the corresponding amplification circuit 132. In this way, when the reading circuit 130 reads the selected image sensing units in the row R2, in addition that the electric charges from the selected image sensing units in the row R2 are read, the electric charges from the particular image sensing unit in the row R1 are also read. Therefore, the quantity of electric charges read by the reading circuit 130 is increased, thereby improving the correctness of a reading result of the reading circuit 130.

In the foregoing plurality of embodiments, the reading circuit 130 does not read a same selected image sensing unit in adjacent touch sensing frames. In this way, the optical touch system 100 can ensure that there is adequate time for each selected image sensing unit to sense a particular light ray.

In addition, because the time length (the first time length T1) of the driving period of the driving clock signal CKD is longer than the time length (the second time length T2) of the non-driving period thereof, the optical touch system 100 can ensure that there is adequate time for the reading circuit 130 to perform reading in each touch sensing frame.

Figure 5A:
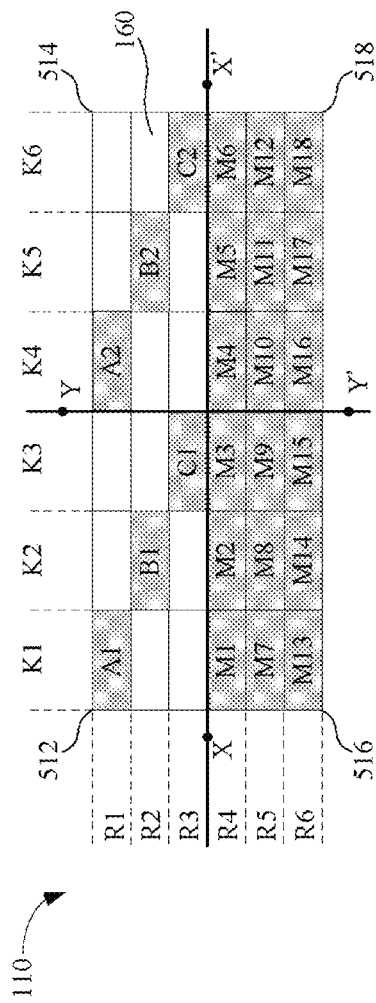
FIG. 5A is a simplified schematic diagram of yet another operation embodiment of the optical touch system in FIG. 1A.

FIG. 5A is a simplified schematic diagram of yet another operation embodiment of the optical touch system 100 in FIG. 1A. As shown in FIG. 5A, the image sensing units 160 on the touch panel 110 are arranged to form the array including the plurality of columns K1 to K6 and the plurality of rows R1 to R6. The touch panel 110 can be divided into a first touch area 512, a second touch area 514, a third touch area 516, and a fourth touch area 518 along a direction of a straight line X-X' and a direction of a straight line Y-Y'. Each of the first to the fourth touch areas 512, 514, 516, and 518 includes a plurality of image sensing units 160.

The plurality of image sensing units 160 in the first touch area 512 includes selected image sensing units A1, B1, and C1, and the selected image sensing units A1, B1, and C1 are located on a diagonal of the first touch area 512. The plurality of image sensing units in the second touch area 514 includes selected image sensing units A2, B2, and C2, and the selected image sensing units A2, B2, and C2 are located on a diagonal of the second touch area 514. The plurality of image sensing units 160 in the third touch area 616 and the fourth touch area 518 include selected image sensing units M1 to M18. That is, the plurality of image sensing units 160 in the third touch area 616 and the fourth touch area 518 are all selected image sensing units.

Figure 5B:
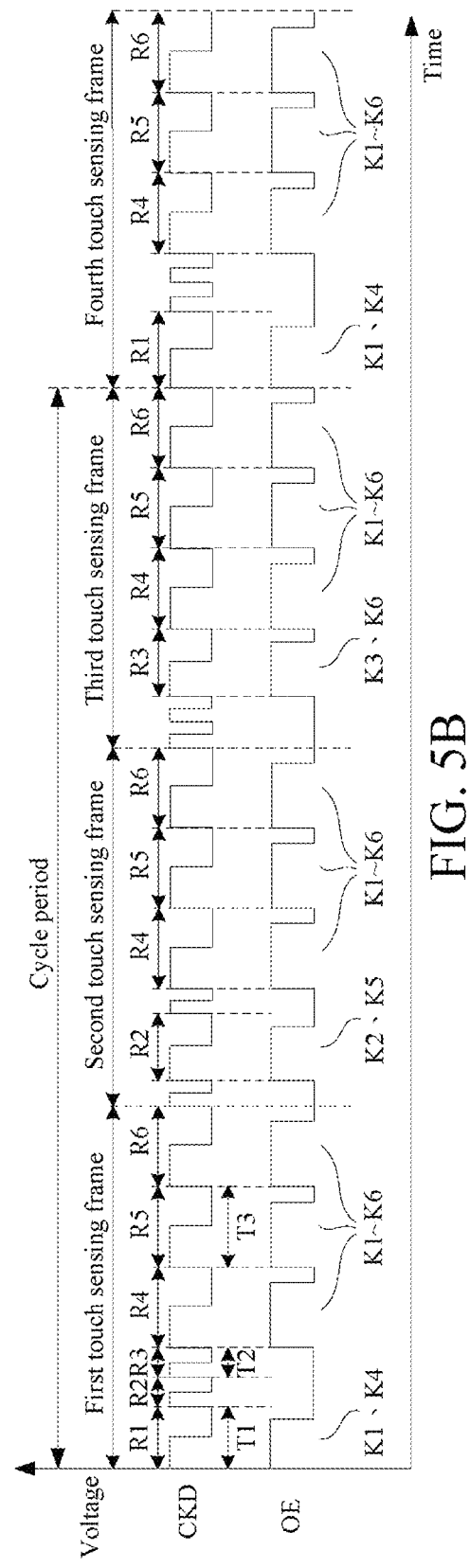
FIG. 5B is a simplified time sequence diagram of the operation embodiment in FIG. 5A.

FIG. 5B is a simplified time sequence diagram of the operation embodiment in FIG. 5A. Referring to FIG. 5A and FIG. 5B, in this embodiment, a driving clock signal CKD includes a plurality of driving periods, a plurality of non-driving periods, and a plurality of extended driving periods. The driving period has a first time length T1, the non-driving period has a second time length T2, and the extended driving period has a third time length T3. The first time length T1 is longer than the second time length T2, and the third time length T3 is longer than the first time length T1.

The driving enable signal OE includes a driving enable period and a rest period. The driving enable signal OE is at a high voltage level in the driving enable period, and the driving enable signal OE is at a low voltage level in the rest period.

During the driving enable period when the driving enable signal OE is at a high voltage level, the driving clock signal CKD is in the driving period having the first time length T1, or in the extended driving period having the third time length T3. During the rest period when the driving enable signal OE is at a low voltage level, the driving clock signal CKD is in the non-driving period having the second time length T2. The selection circuit 120 drives the image sensing unit 160 only when a time sequence of the driving period or the extended driving period of the driving clock signal CKD overlaps a time sequence of the driving enable period of the driving enable signal OE.

Figure 5C:
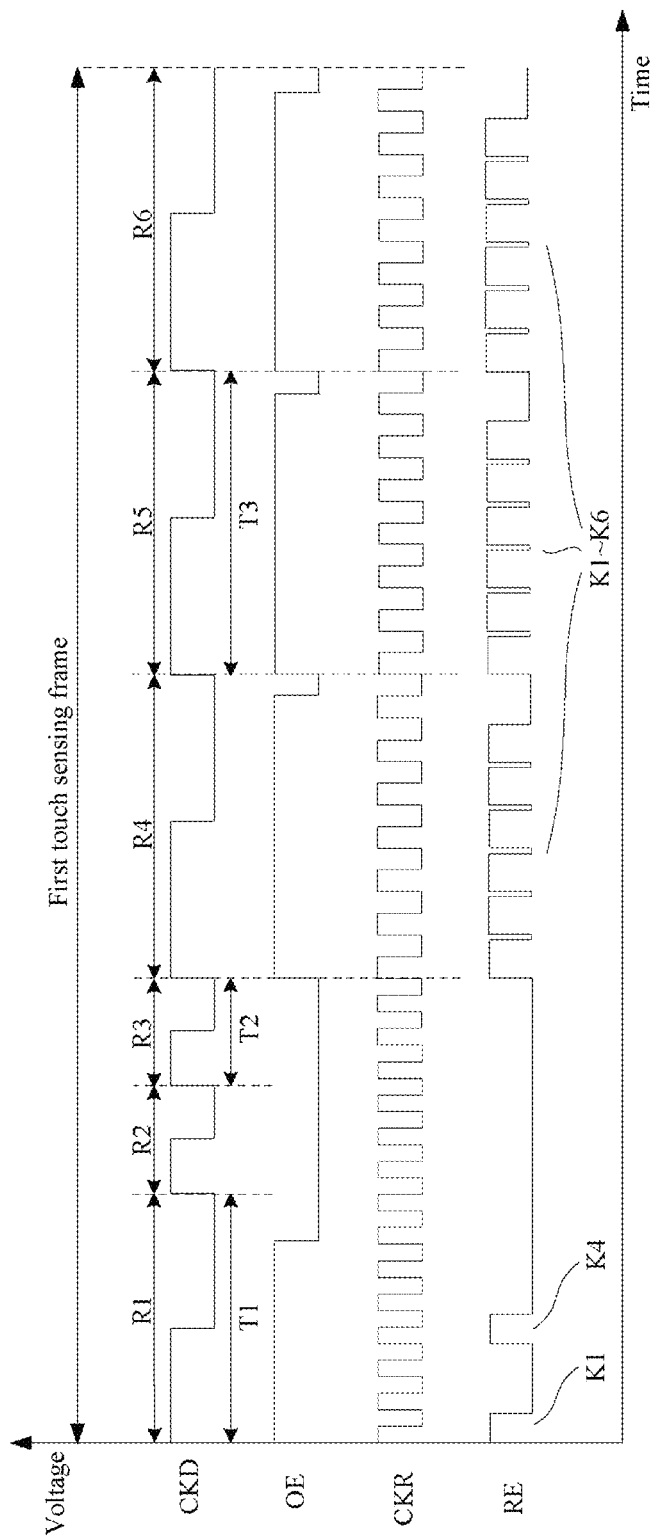
FIG. 5C is a partially enlarged time sequence diagram of FIG. 5B.

FIG. 5C is a partially enlarged time sequence diagram of FIG. 5B. As shown in FIG. 5C, a change relationship between time sequences of a reading clock signal CKR and a reading enable signal RE in this embodiment and a time sequence of a driving enable signal OE is similar to that in the embodiment in FIG. 2A and FIG. 2B. For brevity, details are not described herein again.

Referring to FIG. 5A to FIG. 5C, in a first touch sensing frame in this embodiment, the selection circuit 120 drives the row R1 and the rows R4 to R6. When the selection circuit 120 drives the row R1, the reading enable signal RE is at a high potential when the multiplexer 134 selects the columns K1 and K4, and is at a low potential when the multiplexer 134 selects another column. Therefore, the reading circuit 130 sequentially reads the selected image sensing units A1 and A2 in the row R1. When the selection circuit 120 drives the rows R4 to R6, the reading enable signal RE is at a high potential when the multiplexer 134 selects the columns K1 to K6. Therefore, the reading circuit 130 sequentially reads the selected image sensing units M1 to M18 in the rows R4 to R6.

In a second touch sensing frame in this embodiment, the selection circuit 120 drives the row R2 and the rows R4 to R6. When the selection circuit 120 drives the row R2, the reading enable signal RE is at a high potential when the multiplexer 134 selects the columns K2 and K5, and is at a low potential when the multiplexer 134 selects another column. Therefore, the reading circuit 130 sequentially reads the selected image sensing units B1 and B2 in the row R2. When the selection circuit 120 drives the rows R4 to R6, the reading enable signal RE is at a high potential when the multiplexer 134 selects the columns K1 to K6. Therefore, the reading circuit 130 sequentially reads the selected image sensing units M1 to M18 in the rows R4 to R6.

In a third touch sensing frame in this embodiment, the selection circuit 120 drives the row R3 and the rows R4 to R6. When the selection circuit 120 drives the row R3, the reading enable signal RE is at a high potential when the multiplexer 134 selects the columns K3 and K6, and is at a low potential when the multiplexer 134 selects another column. Therefore, the reading circuit 130 sequentially reads the selected image sensing units C1 and C2 in the row R3. When the selection circuit 120 drives the rows R4 to R6, the reading enable signal RE is at a high potential when the multiplexer 134 selects the columns K1 to K6. Therefore, the reading circuit 130 sequentially reads the selected image sensing units M1 to M18 in the rows R4 to R6.

In a fourth touch sensing frame in this embodiment, cooperative operation between the selection circuit 120 and the reading circuit 130 is similar to the cooperative operation therebetween in the first touch sensing frame. For brevity, details are not described herein again.

It can be learned from the above that, the reading circuit 130 reads all of the image sensing units 160 (that is, the selected image sensing units M1 to M18) in the third touch area 516 and the fourth touch area 518 in each touch sensing frame. Therefore, when the external processing circuit 140 calculates the image of the touching object 101, the resolution of the image calculated according to a plurality of image sensed values in the third touch area 516 and the fourth touch area 518 is higher than the resolution of the image calculated according to a plurality of image sensed values in the first touch area 512 and the second touch area 514.

In addition, because the time length (the third time length T3) of the extended driving period of the driving clock signal CKD is longer than the time length (the first time length T1) of the driving period, there is adequate time for the reading circuit 130 to read the image sensing units 160 in the third touch area 516 and the fourth touch area 518. In this way, the resolution of the image calculated according to the plurality of image sensed values in the third touch area 516 and the fourth touch area 518 further increases.

In practice, the third touch area 516 and the fourth touch area 518 are applied to fingerprint recognition-related application. In addition, in some embodiments in which there is no special requirement on image resolution, the third time length T3 may be set to be equal to the first time length T1.

Apparently, the operating manners of the first touch area 512 and the second touch area 514 in the embodiment in FIG. 5A to FIG. 5C are similar to the operating manners in the embodiment in FIG. 3A and FIG. 3B. In practice, the operating manners of the first touch area 512 and the second touch area 514 in the embodiment in FIG. 5A to FIG. 5C are alternatively set to be similar to the operating manners in the embodiment in FIG. 2A and FIG. 2B or in the embodiment in FIG. 4A and FIG. 4B.

FIG. 6A is a simplified schematic diagram of an operation embodiment of an optical touch system 600 according to another embodiment of the present disclosure. As shown in FIG. 6A, the optical touch system 600 includes a touch panel 610. The touch panel 610 includes a plurality of image sensing units 160. The touch panel 610 can be divided into a first touch area 612, a second touch area 614, a third touch area 616, and a fourth touch area 618 along a direction of a straight line X-X' and a direction of a straight line Y-Y'. Each of the first to the fourth touch areas 612, 614, 616, and 618 includes a plurality of image sensing units 160. The operating manners and advantages of the many functional blocks in the optical touch system 100 are also applicable to the optical touch system 600. For brevity, details are not described herein again. In addition, for simplicity of the drawing and ease of description, other elements and connection relationships in the optical touch system 600 are not drawn in FIG. 6.

An operating manner of the optical touch system 600 is set to be similar to the operating manner in the embodiment in FIG. 3A and FIG. 3B. That is, the optical touch system 600 reads an image sensing unit in each touch area in each touch sensing frame. In addition, the optical touch system 600 sequentially reads a touch sensing unit 160 on a diagonal of each touch area in a direction indicated by a dashed line.

In this embodiment, a touching object 101 touches the first touch area 612, but does not touch the second, the third, and the fourth touch areas 614, 616, and 618. A projection 603 of the touching object 101 on the touch panel 110 covers the second touch area 614. Therefore, both of the first touch area 612 and the second touch area 614 receive a particular light ray reflected by the touching object 101.

FIG. 6B is a time sequence change diagram of an image sensed value obtained after an image sensing unit 160 in FIG. 6A is read by the optical touch system 600 in a plurality of consecutive touch sensing frames. Points A to F respectively represent magnitudes of image sensed values at different positions read by the optical touch system 600 in six touch sensing frames. As shown in FIG. 6B, because the touching object 601 touches the first touch area 612, magnitudes of a plurality of image sensed values in the first touch area 612 present repetitive changes in correspondence with surface texture of the touching object 601 (for example, a fingerprint of a finger).

Because a part of the second touch area 614 is covered by the projection 603, and the remaining area is not covered by the projection 603, magnitudes of a plurality of image sensed values in the second touch area 614 form a group having relatively small numerical values (that is, points A to D), and another group having relatively large numerical values (that is, points E and F). The group having relatively small numerical values corresponds to the part of area covered by the projection 603, and the group having relatively large numerical values corresponds to the remaining area not covered by the projection 603, and a border between the two groups corresponds to a border of the projection 603.

Because the third and the fourth touch areas 616 and 618 neither are touched by the touching object 601, nor are covered by the projection area 603, magnitudes of a plurality of image sensed values in each of the third and the fourth touch areas 616 and 618 are close to each other and are of relatively high numerical values.

The optical touch system 600 can determine a touch area touched by the touching object 101 according to a changing manner of magnitudes of image sensed values at different positions. In this embodiment, because the magnitudes of the plurality of image sensed values in the first touch area 612 present periodic repetitive changes, that is, the sensed values in the touch area 612 in FIG. 6B present changes having peaks and troughs, the optical touch system 600 determines that the touching object 101 touches the first touch area 612.

On the other hand, because the magnitudes of the plurality of image sensed values in each of the second, the third, and the fourth touch areas 614, 616, and 618 do not present periodic repetitive changes, the optical touch system 600 determines that the touching object 101 does not touch the second, the third, and the fourth touch areas 614, 616, and 618.

It can be learned from the above that the optical touch system 600 can effectively reduce a probability that a misoperation is generated because of shadowing.

Figure 7:
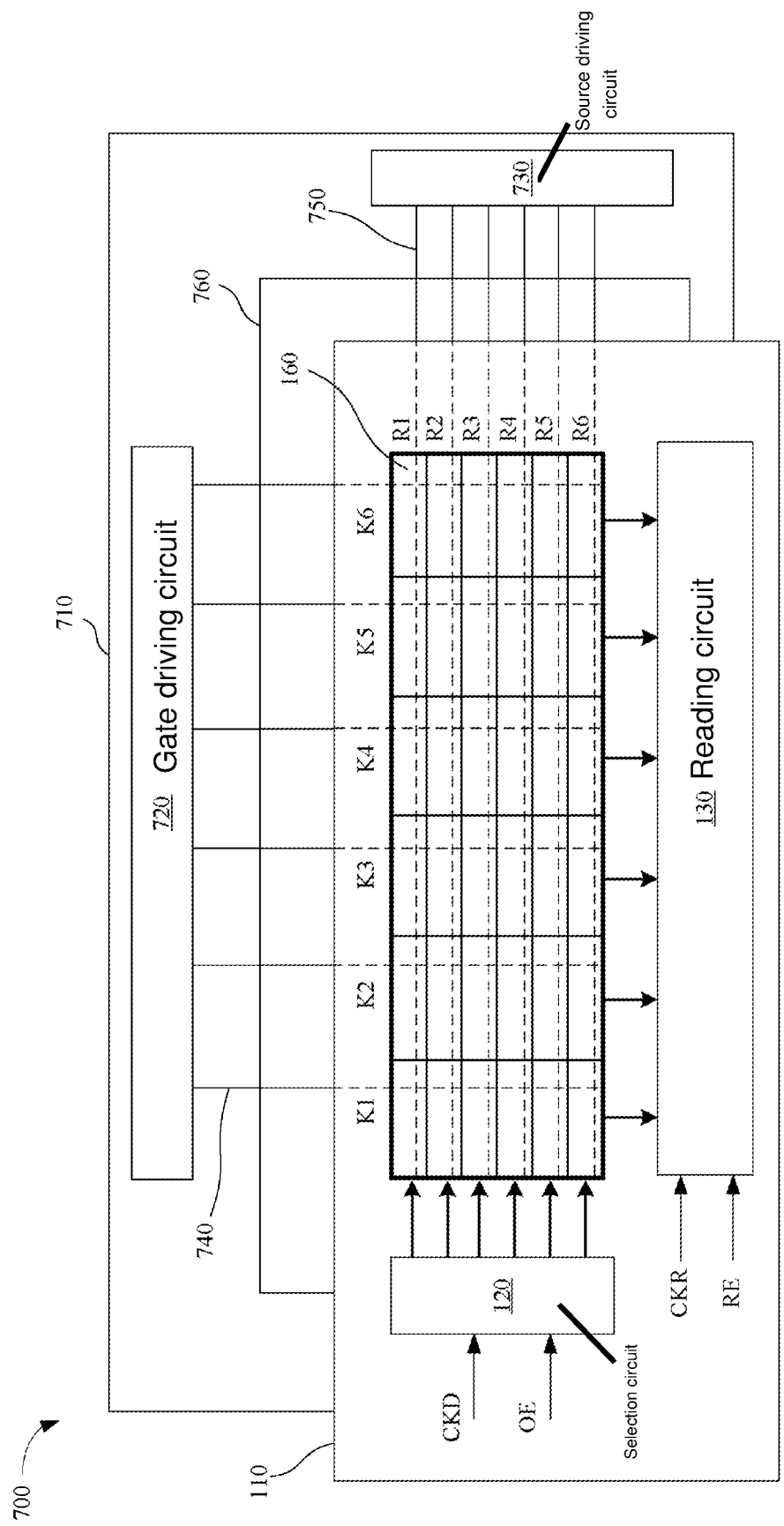
FIG. 7 is a simplified functional block diagram of an optical touch system according to another embodiment of the present disclosure.

FIG. 7 is a simplified functional block diagram of an optical touch system 700 according to another embodiment of the present disclosure. The optical touch system 700 is similar to the optical touch system 100, that is, the operating manners in FIG. 2A to FIG. 4B are also applicable to the optical touch system 700. A difference between the optical touch system 700 and the optical touch system 100 is that the backlight module 150 in the optical touch system 100 is replaced with a display module 710 in the optical touch system 700. For simplicity of the drawing and ease of description, other elements and connection relationships in the optical touch system 700 are not drawn in FIG. 7.

The display module 710 in the optical touch system 700 includes: a gate driving circuit 720, a source driving circuit 730, a plurality of gate signal lines 740, a plurality of source signal lines 750, and a pixel area 760. The plurality of gate signal lines 740 and the plurality of source signal lines 750 are coupled to the pixel area 760. A touch panel 110 is adhered to the display module 710 by using a suitable adhesive, or is assembled with a frame of the display module 710 by using a suitable fixing structure. However, the present invention is not limited thereto.

Similar to the optical touch system 100, a plurality of image sensing units 160 on the touch panel 110 of the optical touch system 700 is arranged to form an array including columns K1 to K6 and rows R1 to R6, and the touch panel 110 of the optical touch system 700 is divided into a plurality of touch areas. The plurality of touch areas overlaps the pixel area 760 in a perpendicular projection direction.

In some embodiments, in the optical touch system 700, only some of the touch areas overlap the pixel area 760 in a perpendicular projection direction.

In the embodiment in FIG. 7, the plurality of image sensing units 160 on the touch panel 110 overlaps the gate signal lines 740 or the source signal lines 750. To prevent a signal on the gate signal lines 740 or the source signal lines 750 from being coupled by using a capacitor and affecting operation of the touch panel 110, the optical touch system 700 uses an operating manner similar to that in the embodiment in FIG. 2A and FIG. 2B, FIG. 3A and FIG. 3B, or FIG. 4A and FIG. 4B.

For example, if the optical touch system 700 uses a vertical reading manner similar to that in FIG. 2A and FIG. 2B, when the gate driving circuit 720 transmits a signal by using a gate signal line 740 overlapping the column K2, the optical touch system 700 can read a selected image sensing unit located in the column K1.

For another example, if the optical touch system 700 uses a horizontal reading manner similar to that in FIG. 4A and FIG. 4B, when the source driving circuit 730 transmits a signal by using a source signal line 750 overlapping the row R2, the optical touch system 700 can read a selected image sensing unit located in the row R1.

For another example, if the optical touch system 700 uses an oblique reading manner similar to that in FIG. 3A to FIG. 3B, when the gate driving circuit 720 transmits a signal by using the gate signal line 740 overlapping the column K2, and the source driving circuit 730 transmits a signal by using the source signal line 750 overlapping the row R2, the optical touch system 700 can read a selected image sensing unit located at an intersection of the column K1 and the row R1. When the gate driving circuit 720 transmits a signal by using a gate signal line 740 overlapping the column K3, and the source driving circuit 730 transmits a signal by using a source signal line 750 overlapping the row R3, the optical touch system 700 can read a selected image sensing unit at an intersection of the column K2 and the row R2. That is, an arrangement direction of the plurality of selected image sensing units is different from an extending direction of the gate signal lines 740 or source signal lines 750.

It can be learned from the above that if an image sensing unit 160 overlaps a gate signal line 740 or a source signal line 750 transmitting a signal, the optical touch system 700 does not read the image sensing unit 160. Therefore, the optical touch system 700 can effectively prevent the display module 710 from affecting the operation of the touch panel 110, so that the optical touch system 700 is applicable to an electronic product, such as a smartphone or a tablet computer, in which a touch panel and a display module need to be combined.

In practice, the optical touch systems 100 and 700 further stitch images in different touch areas, to perform security verification-related judgment. For example, in some embodiments, when a finger of a user moves on the touch panel 110 in the optical touch system 100 or 700, the optical touch system 100 or 700 stitches images in different touch areas, to obtain a fingerprint image of the user. Then, the optical touch system 100 or 700 recognizes an identity of the user according to the fingerprint image, to determine whether to respond to the input operation of the user.

In the drawing and the description of the foregoing embodiments, for ease of describing content by using the drawings, the image sensing units 160 on the touch panel are described by using only the rows R1 to R6 and the columns K1 to K6 as an example. However, the present invention is not limited thereto.

Some words are used in the specification and the claims to refer to particular elements However, it should be understood by a person of ordinary skill in the art that a same element may be referred to by using different nouns. The elements in the specification and the claims are not differentiated according to different names. Instead, a difference between functions of the elements is used as a base for differentiation. The "include" used in the specification and the claims is an open expression, and should be interpreted as "include but is not limited to". In addition, the "couple" herein includes any direct and indirect connection means. Therefore, if there is such a description that a first element is coupled to a second element, it indicates that the first element may be directly connected to the second element by means of electrical connection or signal connection such as wireless transmission or optical transmission, or may be indirectly connected to the second element by means of electrical connection or signal connection by using another element or connection means.

The foregoing are merely preferred embodiments of the present invention. Any equivalent alteration and modification made according to the claims of the present invention shall fall within the scope of the present invention.

What is claimed is:

1. An optical touch system, comprising:
   a touch panel, comprising a plurality of image sensing units, wherein the plurality of image sensing units is arranged to form an array of a plurality of columns and a plurality of rows; and
   a selection circuit, used for driving the plurality of image sensing units according to a driving clock signal and a driving enable signal;
   wherein the driving clock signal comprises a driving period, a non-driving period, and an extended driving period; and
   wherein the driving period has a first time length, the non-driving period has a second time length, the first time length is longer than the second time length, the extended driving period has a third time length, and the third time length is longer than or equal to the first time length.

2. The optical touch system according to claim 1, wherein the driving enable signal comprises a driving enable period and a rest period, and the selection circuit drives the plurality of image sensing units only when the driving enable period overlaps with the driving period.

3. The optical touch system according to claim 1, wherein the driving clock signal is synchronized in both a first touch sensing frame and a second touch sensing frame, the driving enable signal is synchronized in both the first touch sensing frame and the second touch sensing frame, and the first touch sensing frame and the second touch sensing frame are adjacent.

4. An optical touch system, comprising:
   a touch panel, comprising a plurality of image sensing units, wherein the plurality of image sensing units is arranged to form an array of a plurality of columns and a plurality of rows; and
   a selection circuit, used for driving the plurality of image sensing units according to a driving clock signal and a driving enable signal, wherein the driving clock signal comprises a driving period and a non-driving period, the driving period has a first time length, the non-driving period has a second time length, and the first time length is longer than the second time length;
   wherein the driving clock signal is unsynchronized in a first touch sensing frame and a second touch sensing frame, the driving enable signal is unsynchronized in the first touch sensing frame and the second touch sensing frame, and the first touch sensing frame and the second touch sensing frame are adjacent.

5. An optical touch system, comprising:
   a touch panel, comprising a plurality of image sensing units, wherein the plurality of image sensing units is arranged to form an array of a plurality of columns and a plurality of rows;
   a selection circuit, used for driving the plurality of image sensing units according to a driving clock signal and a driving enable signal, wherein the driving clock signal comprises a driving period and a non-driving period, the driving period has a first time length, the non-driving period has a second time length, and the first time length is longer than the second time length; and
   a reading circuit, for reading the plurality of image sensing units according to a reading enable signal, wherein the reading enable signal switches a voltage level one or more times in the driving enable period or the rest period.

* * * * *